United States Patent
Roba et al.

(10) Patent No.: US 6,715,323 B1
(45) Date of Patent: Apr. 6, 2004

(54) METHOD AND APPARATUS FOR COOLING OPTICAL FIBERS

(75) Inventors: Giacomo Stefano Roba, Monza (IT); Roberto Pata, Bergamo (IT)

(73) Assignee: Pirelli Cavi E Sistemi S.p.A., Milan (IT)

( * ) Notice: Subject to any disclaimer, the term of this patent is extended or adjusted under 35 U.S.C. 154(b) by 0 days.

(21) Appl. No.: 09/573,702

(22) Filed: May 19, 2000

Related U.S. Application Data

(63) Continuation of application No. PCT/EP98/07371, filed on Nov. 18, 1998.
(60) Provisional application No. 60/069,308, filed on Nov. 24, 1997.

(30) Foreign Application Priority Data

Nov. 21, 1997 (EP) ............................................. 97120403

(51) Int. Cl.[7] ............................................. C03B 37/023
(52) U.S. Cl. ............................. 65/434; 65/513; 65/510
(58) Field of Search .......................... 65/434, 513, 510, 65/530

(56) References Cited

U.S. PATENT DOCUMENTS

| | | |
|---|---|---|
| 4,437,870 A | 3/1984 | Miller |
| 4,514,205 A | 4/1985 | Darcangelo et al. |
| 4,578,098 A * | 3/1986 | Paek et al. ..................... 65/356 |
| 4,664,689 A | 5/1987 | Davis |
| 4,838,918 A | 6/1989 | Vaughan et al. |
| 4,913,715 A | 4/1990 | Jochem et al. |
| 4,966,615 A | 10/1990 | Linden et al. |
| 5,314,515 A * | 5/1994 | Cain ........................... 65/434 |
| 5,452,583 A | 9/1995 | Schulte |
| 5,897,682 A * | 4/1999 | Koaizawa et al. ............. 65/484 |
| 6,029,476 A * | 2/2000 | Bourhis et al. ............. 118/420 |
| 6,370,920 B1 * | 4/2002 | Overton et al. ............... 65/510 |

FOREIGN PATENT DOCUMENTS

| | | |
|---|---|---|
| DE | 44 12 563 | 10/1995 |
| EP | 0 312 081 | 4/1989 |
| EP | 0 319 374 | 6/1989 |
| GB | 2 287 244 | 9/1995 |
| JP | 5-10161 * | 3/1993 .................. 65/434 |

OTHER PUBLICATIONS

S. Sakaguchi, "Optical Fiber Drawing Apparatus", Patent Abstracts of Japan—JP 53 125857, (1978), (Abstract Only).
K. Sawada, "Optical Fiber Cooler", Patent Abstracts of Japan—JP 04 240139, (1992), (Abstract Only).
L. Pozdnyakov et al., Soviet Inventions Illustrated, Derwent Publications Ltd., London, GB, Abstract of SU 1, 723,059, (1993), (Abstract Only).

* cited by examiner

Primary Examiner—John Hoffmann
(74) Attorney, Agent, or Firm—Finnegan, Henderson, Farabow, Garrett & Dunner, L.L.P.

(57) ABSTRACT

The present invention relates to a method and apparatus for cooling an optical fiber during the drawing process of said fiber.

In particular the present method for cooling an optical fiber comprises flowing a cooling gas onto the optical fiber wherein the flow direction of the cooling gas is substantially transversal with respect the longitudinal axis of the fiber.

It has been found that by employing a flow of cooling gas being substantially transversal to the longitudinal axis of the drawn fiber, the cooling efficiency of the fiber may be substantially improved.

The apparatus according to the invention comprises a hollow elongated body, said hollow elongated body having at least one wall defining an internal elongated space through which the drawn fiber passes wherein the at least one wall of said hollow elongated body is provided with at least one longitudinal opening through which a cooling gas is introduced into the hollow body and at least one longitudinal opening through which said cooling gas is removed from said hollow body.

16 Claims, 4 Drawing Sheets

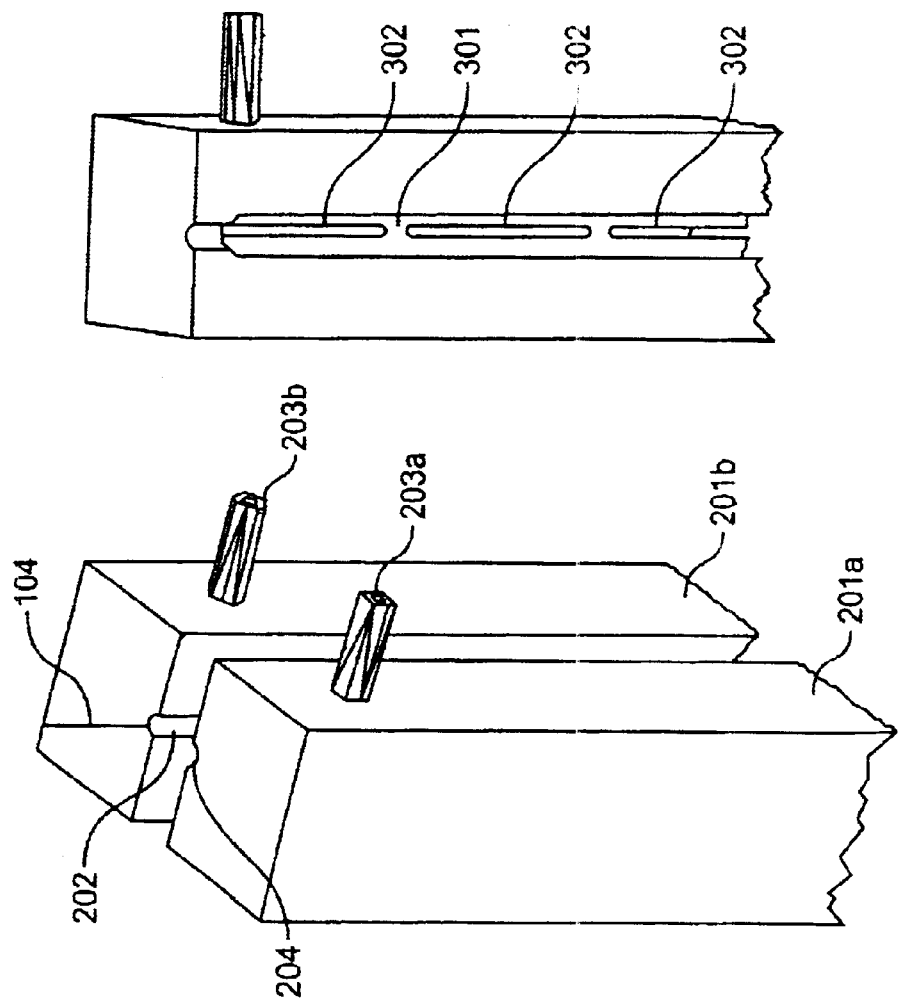

METHOD AND APPARATUS FOR COOLING OPTICAL FIBERS

This application is a continuation of International Application No. PCT/EP98/07371, filed Nov. 18, 1998, the content of which is incorporated herein by reference and claims the benefit of U.S. Provisional Application No. 60/069,308, filed Nov. 24, 1997.

The present invention relates to a method and apparatus for cooling an optical fiber during the drawing process of said fiber.

In the production of optical fibers, a glass preform is first prepared according to known technologies, comprising VAD (vapor axial deposition), OVD (outside vapor deposition) and MCVD (modified chemical vapor deposition), by depositing a soot of glass particles; said soot-glass preform is then consolidated before drawing the fiber.

The optical fiber is obtained from the consolidated preform by heating the bottom end of the preform at its softening temperature into a so-called "drawing furnace" and drawing the fiber from said softened preform under controlled conditions, according to known procedures. Upon cooling, the glass solidifies into the optical fiber, which is very fragile. Thus, during the drawing phase, before collecting it, the fiber is normally coated with one or more layers of synthetic coating material—preferably two layers—for instance urethane-acrylate resins) for protecting it.

In general the coating of the fiber is performed by passing the fiber through a "coating-die", which contains a liquid resin. The fiber, which in general has a temperature of about 2000° C. at its outlet from the drawing furnace, has to be cooled before entering into the coating-die at a temperature compatible with the one of the coating application technique, (in general below 100° C., preferably at about 25° C.–60° C.) for avoiding possible inconveniences during the coating phase due to the high temperature of the fiber, resulting in irregular deposition of the coating layer. By increasing the draw speed, the fiber requires longer distances for cooling down to a temperature suitable for the coating application. For instance, as reported in U.S. Pat. No. 4,437,870, a distance of 120 cm is required for natural cooling a fiber with a 125 $\mu$m diameter from 1780° C. down to 50° C., with a draw speed of 0.75 m/sec; when the draw speed is increased up to 5 m/sec, a 800 cm cooling distance is required. With the increasing rate of the drawing speed the distance between the drawing furnace and the coating die would increase too much when only a natural cooling is applied; it has thus been suggested to employ cooling means for force-cooling the fiber at a suitable temperature for the coating application, allowing to employ shorter cooling distances.

U.S. Pat. No. 4,437,870 discloses an apparatus for cooling the fiber which consists of a vertical tube through which the fiber is drawn, said tube being provided at its bottom end with a cylindrically-shaped porous member. Cooling gas is supplied into a chamber surrounding the porous member, and then, through said porous member, it flows upwardly along the fiber to the top of the cooling tube. A chamber containing liquefied gas (nitrogen) surrounds the cooling tube. According to an alternative embodiment the fiber is drawn through a vertical tube, which may be surrounded by a layer of insulating material, having an annular opening at its bottom through which cooling gas emanates into the tube, flowing upwardly to the top of the cooling tube.

U.S. Pat. No. 4,514,205 discloses an apparatus for cooling the fiber consisting of a cooling tube surrounding the fiber, which tube is centrally disposed in a reservoir containing liquefied gas. The cooling gas flows first through a coil disposed into the reservoir, thus being cooled by the liquefied gas contained in said reservoir, and then into the cooling tube axially along the fiber.

U.S. Pat. No. 4,913,715 discloses a cooling apparatus wherein the fiber is drawn through a forced-cooled double-walled tube. The inner space of the tube, through which the fiber passes, contains a gas with good heat-transporting properties, having a flow which is reduced but sufficient to prevent the penetration of the surrounding atmosphere into the tube and to compensate loss of gas. According to the method disclosed in this patent, the fiber is thus cooled substantially by heat transfer to the cooled wall by means of the heat-transporting gas surrounding the fiber.

U.S. Pat. No. 4,966,615 discloses a cooling tube surrounded by a cooling jacket. A number of ring-shaped partition plates, spaced from each other, are mounted within the tube. The partition plates allows breaking the laminar flow of the gas through the tube, in order to increase the heat transfer between gas and fiber.

U.S. Pat. No. 4,838,918 discloses a method for cooling an optical fiber wherein said fiber is passed between two parallel plates cooled with nitrogen, a laminar flow of inert gas being directed onto said fiber along a plane centrally located between said plates, said laminar flow being generated by a ½ inch tube provided on its surface with a number of holes of 1/16 inches diameter, spaced one inch apart from each other.

EP 319,374 discloses a cooling device comprising a pair of parallel plates between which the fiber is passed, said plates being optionally cooled for absorbing the heat radiating from the fiber, and a pair of vertically oriented copper tubes delivering a laminar flow of room temperature nitrogen gas between the parallel plates to surround the downwardly moving fiber.

GB 2,287,244 discloses the cooling device comprising an elongated water-cooled body member provided with a through hole opening out abruptly into a succession of spherical chambers in which a cyclonic flow of gas is induced by the tangential injection of helium, preferably with opposite cyclonic rotation in successive chambers.

DE 4,412,563 discloses a cooling device having a plurality of gas-flow openings in a structure surrounding longitudinal axis of the fiber, said plurality of gas-flow being positioned at respective different heights along said structure.

U.S. Pat. No. 4,664,689 relates to a method and apparatus for rapidly cooling an optical fiber comprising passing the optical fiber through an enclosure having a flat back internal surface, the walls of said enclosure having symmetrically oriented perforations or other symmetrically oriented means of passing cryogenic gas through the walls to contact the optical fiber within the enclosures.

The applicant has noticed that the above cooling devices and methods have some drawbacks in their use, in particular as they can not be easily adapted to the variations of the drawing conditions.

Furthermore, the applicant has also observed that with conventional cooling methods employing an axial flow of cooling gas, the possibility to increase the drawing speed is also limited from a critical value of the flow rate of the cooling gas (depending on its initial temperature and on the length of the tube), above which there is a saturation of the cooling efficiency of the gas, with no substantial increase in the cooling capacity of the gas.

In addition, in the method and apparatus disclosed in U.S. Pat. No. 4,838,918, the applicant has observed that the efficiency of the cooling of the fiber can be reduced by the fact that the cooling gas is provided by means of small holes spaced from each other and that there are no means for effectively removing the inert gas from the apparatus.

It has now been found that according to the present invention, the efficiency of the cooling of the optical fiber can be improved by passing said fiber through a hollow elongated body, said body being provided with at least a first longitudinal opening and at least a second longitudinal opening, both said openings being provided substantially on the whole length of said elongated body and said second opening being positioned at substantially the opposite side with respect to said first opening, wherein the cooling gas is passed through said first opening, directed onto the fiber and removed from the opposite second opening. Accordingly, the cooling method of the invention provides a flow of cooling gas which is substantially transversal with respect the longitudinal axis of the drawn fiber, for the whole path of the cooling gas inside the elongated hollow body. In the present description the wording "flow direction substantially transversal with respect to the longitudinal axis of the fiber" is intended to encompass any condition in which the cooling gas flows transversally to the longitudinal axis of the fiber from one side to the other of the elongated hollow body through which the fiber passes. Preferably, the direction of the transversal flow of the cooling gas is substantially perpendicular with respect to the longitudinal axis of the fiber.

One aspect of the present invention thus relates to a method for cooling an optical fiber which comprises:

passing said fiber through a hollow elongated body, said elongated body being provided with at least a first longitudinal opening and at least a second longitudinal opening;

flowing a cooling gas through said first opening, wherein the flow direction of the cooling gas is substantially transversal with respect the longitudinal axis of the fiber;

removing said cooling gas from the hollow elongated body through said second opening.

According to a preferred embodiment, said openings are provided on at least half of the total length of said elongated body. Preferably, the length of said openings corresponds to at least 75% of the total length of said elongated hollow body; in particular, the length of said openings ranges from about 80% to about 95% of the total length of said elongated hollow body. According to a preferred embodiment, said second opening is positioned substantially on the opposite side of said elongated body with respect to said first opening. Furthermore, the cooling gas is preferably forcibly removed from said hollow elongated body through said second longitudinal opening.

According to a preferred embodiment, the method of the present invention comprises:

introducing a cooling gas at a predetermined temperature into a first hollow space defined by an inner and an outer wall of a first double-walled half-tube;

flowing said cooling gas from said first hollow space through at least one longitudinal opening, provided on the inner wall of said first double-walled half-tube, into a central chamber defined by the inner wall of said first double-walled half-tube and by the inner wall of a second double-walled half-tube, in order to cool an optical fiber being passed through said central chamber;

flowing the cooling gas from said central chamber through at least a second longitudinal opening, provided on the inner wall of said second double-walled half-tube, into a second hollow space defined by the inner and the outer wall of said second double-walled half-tube;

removing the cooling gas from said second hollow space.

According to a preferred embodiment the cooling method of the present invention comprises:

subjecting at least a first portion of the fiber to a substantially transversal flow of cooling gas in a first direction; and subjecting at least a second portion of said fiber to a second substantially transversal flow of cooling gas in a second direction, said second direction preferably being substantially opposite with respect to the first one.

A further aspect of the present invention relates to a cooling device for cooling an optical fiber drawn from a softened preform, said device comprising a hollow elongated body, said hollow elongated body having at least one wall defining an internal elongated space through which the drawn fiber passes wherein the at least one wall of said hollow elongated body is provided with at least one longitudinal opening through which a cooling gas is introduced into the hollow body and at least one longitudinal opening through which said cooling gas is removed from said hollow body, said openings having respective orientations with respect to the path of the optical fiber through the hollow body, such that the flow direction of the cooling gas results substantially transversal with respect the longitudinal axis of the fiber passing through said hollow elongated body.

Typically, said hollow elongated body is a tube.

According to a preferred embodiment, the above mentioned hollow elongated body is a double-walled tube comprising an inner and an outer wall defining a first hollow space, wherein:

the inner wall of the tube defines a second hollow space corresponding to the central part of the tube through which the fiber passes;

said inner wall is provided with the at least one longitudinal opening through which the cooling gas from the first hollow space is introduced into the central part of the tube and at least one longitudinal opening through which said cooling gas is removed from the central part into the first hollow, space.

According to a preferred embodiment, said double-walled tube comprises two separate halves joined together to form the tube, the inner walls of the two halves delimiting a central part of the cooling tube through which the fiber passes, each half having the inner wall provided with at least one longitudinal opening. The cooling gas flows from an inlet into the hollow space defined by the inner and outer wall of the first half and then, through the at least one slot on the inner wall of said first half, into the central part of the cooling tube onto the fiber; then, the cooling gas flows from the central part of the cooling tube through the at least one slot on the inner wall of second half into the hollow space defined by the two walls of the second half and is removed through an outlet connected to said hollow space of the second half.

A further aspect of the present invention relates to a cooling system for cooling an optical fiber which comprises:

a cooling apparatus in which a cooling gas is flown onto the optical fiber with a substantially transversal flow direction with respect the longitudinal axis of the fiber; and a regeneration unit, connected to said cooling apparatus.

Preferably, said regeneration unit comprises at least a purification or a refrigeration device for purifying and/or refrigerating the cooling gas.

For a better understanding of the present invention, reference is made to the following drawings, which illustrate an example of a possible embodiment of the present invention.

FIG. 2 is a perspective view of one embodiment of the cooling tube according to the present invention.

FIG. 3 is a perspective view of one of the two halves of the cooling tube represented in FIG. 2.

Figure 1:
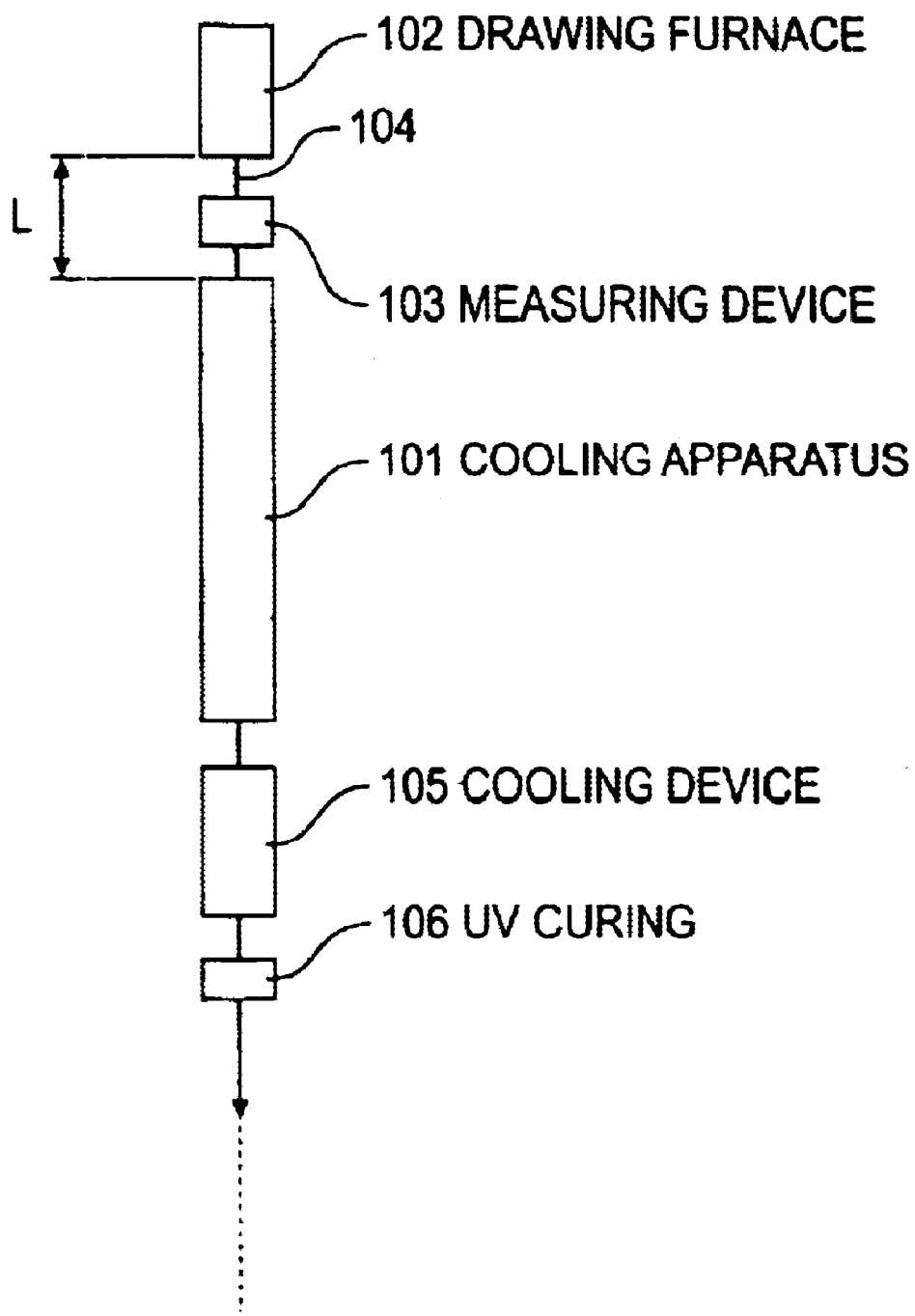
FIG. 1 is a diagrammatic block representation of a system for drawing optical fibers.

The drawing system represented in FIG. 1 comprises the drawing furnace 102, wherein the bottom of the optical preform is heated at its softening temperature, an apparatus 103 for measuring the diameter of the drawn fiber 104, a cooling apparatus 101 for cooling the fiber before coating it and a coating device 105 for applying the protective coating onto the fiber. The optical preform is generally connected to moving means for progressively moving the preform downwardly to the heating zone of the furnace while the fiber is being drawn. The coating device may comprise a coating die, containing a liquid curable resin composition (e.g. urethane-acrylate based resin), followed by a UV curing apparatus 106. When desired, further coating devices may be positioned after the first one, for applying further layers of different coating compositions onto the fiber.

The distance "L" between the cooling apparatus 101 and the coating device 105 depends on the temperature of the fiber at its outlet from the cooling tube; if the fiber has not been cooled below a value compatible with the coating operation, the coating device should be positioned at a certain distance from the cooling device for allowing the further cooling of fiber. With the cooling method and apparatus of the invention, it is possible to obtain a fiber at the outlet of the cooling apparatus having a temperature below 40° C., typically of about 20° C. According to a preferred embodiment it is thus possible to place the coating apparatus 103 substantially in contact with the cooling apparatus 101.

As for the distance between the drawing furnace 102 and the cooling device 101, the applicant has determined that the fiber should preferably enter into the cooling device at a temperature below the glass transition temperature of silica, typically at about 1100° C. In,this connection, assuming a temperature of the fiber of about 1850° C. at its outlet from the furnace, the fiber would take about 0.12 seconds for natural cooling down to 1100° C., with a temperature of the air of about 20° C. This means a distance of about 0.6 m of the cooling device from the bottom of the furnace for a drawing speed of about 5 m/s, up to a distance of about 2.4 m for a drawing speed of about 20 m/s. In the practice, said distances of the cooling device from the furnace are preferably increased of about 1 meter (thus a total distance of about 1.6 m and 3.4 m for the above drawing speeds), thus allowing the fiber to enter into the cooling device at a temperature of about 1000° C. or lower.

The cooling gas is selected from those known in the art having a high heat transfer coefficient. A gas with a high heat transfer coefficient is typically one which has high thermal conductivity, high specific heat and low viscosity. Examples of gases suitably employable are helium, carbon dioxide, argon, and nitrogen, and mixtures thereof. Preferably, helium is employed. The temperature of the cooling gas at its inlet into the cooling should be sufficiently low as to provide the desired cooling of the fiber; however, due to the high cooling efficiency of the present transversal flow method, it is not necessary to employ too low temperatures. Said temperature is preferably from −20° C. to about 20° C., preferably from about 0° and 10° C.

The flow rate of the cooling gas will depend on the geometrical dimensions of the cooling tube and on the desired cooling of the fiber. The flow rate should also be selected in order to avoid an excessive speed of the gas onto the fiber, which may cause undesired movements of said fiber. For instance, with reference to the cooling apparatus reported in the examples, the flow rate of cooling gas per unitary length (1 meter) of the cooling tube (hereinafter "unitary flow rate") will be from about 20 l/min to about 200 l/min, preferably from about 75 l/min to about 150 l/min.

The cooling tube of FIG. 2 is formed by joining two "C-shaped" double-walled tubes, identified as 201a and 201b. FIG. 3 shows in detail one of these two "C-shaped" double walled tubes. The joining of the two halves 201a and 201b defines the central part 202 of the cooling tube, through which the drawn fiber 104 passes and is cooled. The top and the bottom faces of the tube are provided with a passage 204 for the fiber. The two half tubes are joined by means of suitable removable connecting elements (not shown) such as, but not limited to, screws, clamps, clips and the like; a gas seal, not shown in FIG. 2 is provided between the two halves. Each of the two halves is provided with a passage 203a and 203b, for the inlet and outlet of the cooling gas. As the two parts 201a and b are substantially identical, said passages may serve either as inlet or outlet of the cooling gas; this provides an advantageous flexibility of the apparatus, allowing to easily change the flow direction of the cooling gas through the central part of the cooling tube.

FIG. 3 shows in detail the half part 201b of the above cooling tube. The inner wall 301 of said half part (as the inner wall of the corresponding half part 201a) is provided with a plurality of slots 302, through which the cooling gas flows from the hollow space of the double-walled half-tube towards the central part of the cooling device, or alternatively, through which the cooling gas is removed from the central part of the cooling device into the hollow space of the double-walled half-tube. Instead of a plurality of slots, it is also possible to provide the inner wall with a single slot, substantially for the whole length of the tube. Preferably, each slot has a length of from about 2 cm to about 10 cm, preferably of about 5 cm. The width of the slot is suitably dimensioned to allow a substantial amount of the cooling gas to impact onto the fiber. Preferably, the width of the slot is comprised from about 0.5 to about 3 mm, particularly preferred being a width of about 1 mm. Gas seals (405 in FIGS. 4 and 5) are provided on the faces of the half-tube 201b being joined to the corresponding faces of the other half-tube 201a.

Figure 4:
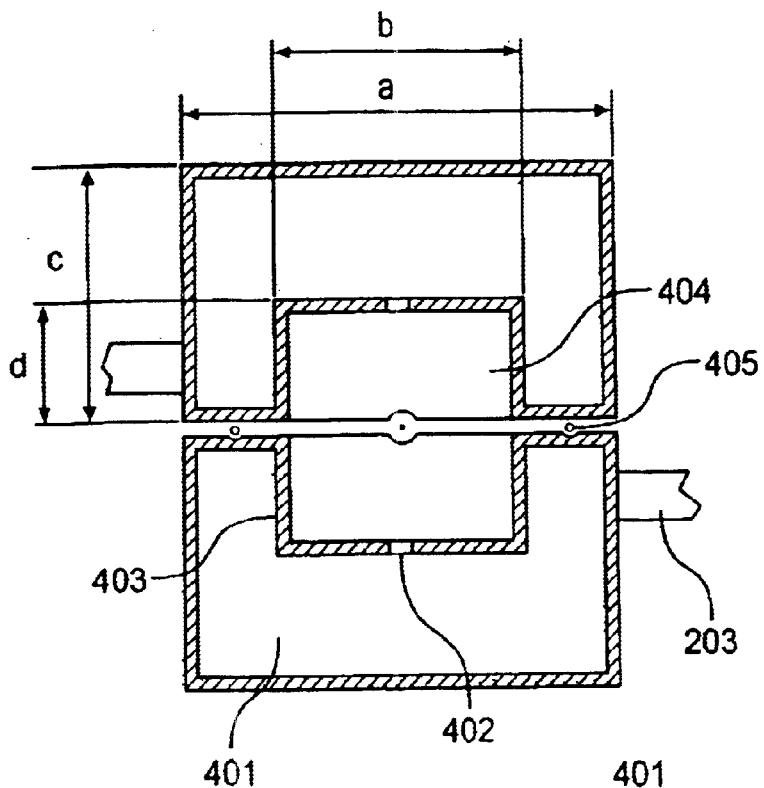
FIG. 4 is a cross-sectional top view the cooling tube of FIG. 2.
Figure 5:
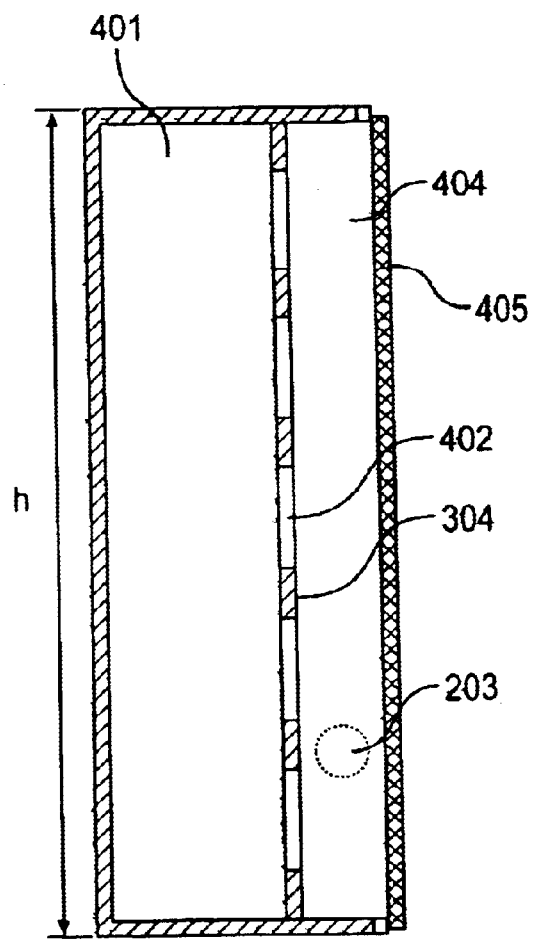
FIG. 5 is a cross-sectional lateral view of the half of the cooling tube represent in FIG. 3.

The cross-sectional view of FIG. 4 shows a possible geometry of the double-walled cooling tube of the invention. The inlet chamber 401 is suitably dimensioned so to allow the gas to substantially homogeneously diffuse inside said chamber before flowing through the slot 402 onto the fiber 104 being drawn through the central part 404 of the cooling tube, thereby not causing undesired vibrations or misalignments of the fiber due to a turbulent or inhomogeneous flow of the gas onto the fiber. For instance, with a flow rate of cooling gas of about 75 l/min, suitable dimensions of the tube shown in FIGS. 3 and 4 are about the following: a=40 mm, b=16 mm, c=20 mm, d=8 mm and h=55 cm.

The gas inlet passage 203 is preferably positioned in such a way as to avoid a linear path of the gas from the inlet towards the slot; this again to facilitate a substantial homogeneous diffusion of the gas into the chamber 401. For instance, according to the embodiment shown in the figures, the inlet is positioned transversally with an angle of about 90° with respect the slots, the gas flow being directed towards the inner wall 403 perpendicular to the one bearing the slots. When more than one slot is present, the inlet passage 203 is preferably positioned in correspondence with the junction space 304 between two contiguous slots, as shown in FIG. 4. Furthermore, for allowing the better diffusion of the cooling gas inside the chamber 401, the inlet passage is preferably positioned in the lower part of the cooling tube, in particular at a height of from about ⅓ to about ¹/₁₀ from the bottom end of the cooling tube.

Also the dimensions of the central part 202 of the cooling tube are suitably adapted as to provide the desired flow rate and speed of the gas onto the fiber. In particular said dimensions are set to maximize the ratio between the gas speed (in the proximity of the fiber) and its flow rate. This because, with the transversal flow, the convective thermal exchange coefficient of the gas with the fiber (corresponding to the cooling efficiency) increases at the increasing of the transversal speed of the gas onto the fiber. Accordingly, the dimensions of the chamber are preferably set in order that the speed pattern of the gas, in the plane perpendicular to the axis of the drawn fiber, is not completely developed in correspondence with the fiber. Such a pattern is typically a "bell-shaped" pattern where the speed of the gas in the central part of the chamber is higher than the speed of gas in the same zone in a completely developed "parabolic" profile.

Preferably, the distance between two opposite slots of about 1 mm width is from about 10 mm to about 20 mm, particularly preferred being a distance of about 16 mm. Also preferably, the width of the central part of the cooling tube is from about 10 mm to about 20 mm. According to a preferred embodiment, the length and the width of the central part are substantially the same.

According to the present invention, the conditions of the gas flowing inside the cooling tube may be either of substantial laminar flow or of slightly turbulent flow. While the laminar conditions allow a better control of the whole cooling process, according to applicant's observations, a slightly turbulent gas flow onto the fiber will increase the heat exchange between gas and fiber. In any case, attention should be paid not to increase too much the turbulence of the gas flow, in order to avoid undesired and uncontrolled vibrations or misalignments of the fiber during the cooling process. A typical gas flow, with particular reference to the cooling device illustrated in the examples, will preferably have a number of Reynolds lower than 3000, preferably lower than 2800, e.g. comprised from about 2800 and 2300.

As previously said, the cooling gas can be provided from inlet 203b into the inlet chamber 401 and then through slots 402 into the central chamber 404 at a unitary flow rate of from about 20 l/min to about 200 l/min, preferably from about 75 l/min to about 150 l/min. Typically, the pressure of the cooling gas inside the central chamber 404 will be from about 1 bar to about 2 bars.

To allow the cooling gas to be removed from the central chamber of the cooling tube, vacuum may be applied to the outlet 203a, e.g. from about 0.3 bars to about 0.9 bars. Conventional devices, such as a vacuum pump, may be employed to obtain the desired level of vacuum. The same vacuum pump may be used to generate the desired overpressure (e.g. about 3–5 bars) to allow the cooling gas to flow from the outlet of the pump through the circuit again into the inlet chamber 401. Alternatively, a series of pumps may be provided to generate the desired overpressure.

Figure 6:
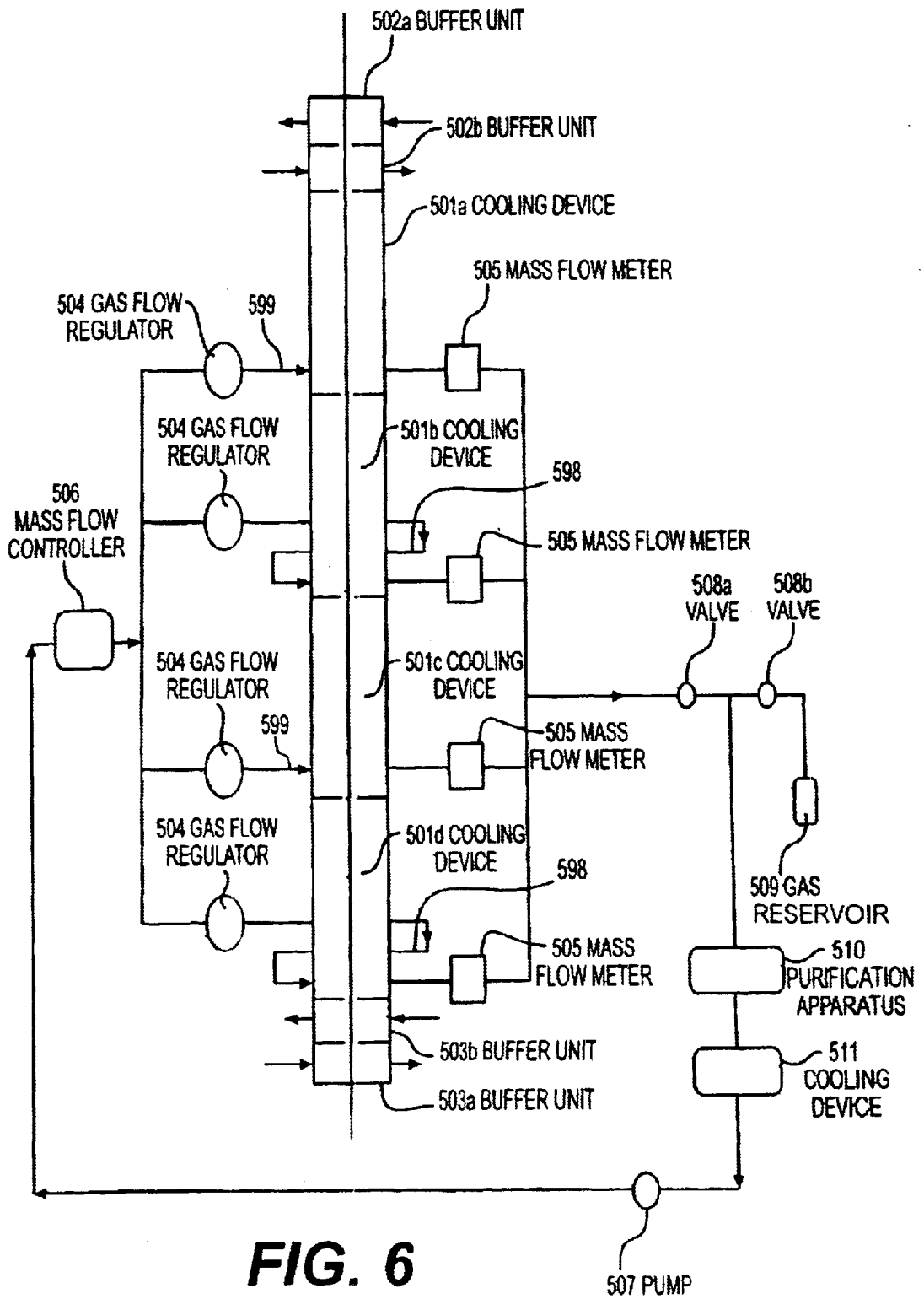
FIG. 6 is a schematic representation of the functioning of a cooling apparatus according to the present invention.

The cooling apparatus schematically represented in FIG. 6 is a cooling unit comprising four cooling devices or tubes (501a, b, c and d) placed one upon the other. For the sake of conciseness, the cooling tubes 501a–d forming the cooling unit will be named "modules" in the following of the specification. The modules are so disposed as to provide a transversal flow of the gas through the slots into the central part of the tube which is in opposite direction when taking into consideration the flow in two adjacent modules. With reference to FIG. 6, the flow direction of the gas is from left to right (represented by arrows 599) for modules 501a and 501c, and from right to left (represented by arrows 598) for modules 501b and 501d. This configuration avoids possible undesired deformations or misalignments of the fiber, due to a one-sided flow direction of the gas onto the fiber. Accordingly, the modules are preferably used in a number of at least two, in order to allow the above alternate flow direction of cooling gas. Particularly preferred is a cooling device comprising a number of modules which is a multiple of two. Typically, each module has a length of from about 40 to about 70 cm, preferably of about 55 cm.

Each module, in particular the two halves of each module, may consist of a single piece which is joined to the other single-piece modules in order to provide the desired length of the cooling unity. Alternatively, the above cooling unit may be obtained by joining two single-piece symmetric halves, internally separated into the desired number of modules. For instance, a single cooling unit may advantageously consist of two symmetric single-piece halves, each consisting of two or four modules as above defined; this may substantially reduce the number of operations during the assembling of the cooling device as well as the total number of joint-points in the cooling device. According to a preferred aspect of the present invention, two cooling units, each comprised of four modules, may advantageously be used.

Each modulus is advantageously connected to a gas flow regulator 504, for regulating the gas inlet, and to a mass flow meter 505. A mass flow controller 506 is advantageously positioned upstream to each of the gas flow regulators 504.

The cooling unit can advantageously be connected to a regeneration unit.

Accordingly, the cooling gas is collected from the outlet of each module and sent, through a valve 508a, to a regeneration unit comprising, for instance, a purification apparatus 510, for eliminating possible impurities in the gas, and a cooling device 511, for refrigerating the gas at the desired temperature. When the cooling gas is employed at about room temperature, a water heat exchanger may be provided for cooling the exhausted gas, the water temperature being at about 15°–20° C.; otherwise, for lower temperatures, other suitable cooling agents (e.g. liquid nitrogen) may be provided. A gas reservoir 509 can be employed, in order to provide the necessary amount of gas to the cooling device, through valve 508b. A pump 507 can advantageously be employed to send the gas to the cooling device.

For instance, the regenerating apparatus disclosed in U.S. Pat. No. 5,452,583 may be suitably employed.

Two buffer units 502 and 503, not connected to the regenerating apparatus, are positioned at the top and at the bottom of the cooling unity, in particular at the top of module 501a and at the bottom of module 501d, to avoid the inlet of air from the outside, thus isolating the cooling gas from the outside, facilitating the recycling operations. Each of the two buffers comprises two separate chambers (502a, 502b and 503a, 503b, respectively) where the buffer gas flows in alternate direction. The two chambers of the buffer units will have substantially the same geometry as the cooling tube, i.e. with at least one slot on the inner wall for the passage of the buffer gas and with a small passage on the top and bottom faces for the fiber. Typically, said buffer units have a length of from about 2 cm to about 4 cm. The unitary flow rate of the buffer gas into the buffer units (i.e. the flow rate for one meter of length of the buffer unit) will generally be slightly lower than the unitary flow rate of the cooling gas, so to avoid or minimize the flow of the buffer gas inside the cooling tube. Thus the unitary flow rate of the buffer gas is preferably from about 50 l/min to about 100 l/min. The gas flowing in the buffer units may be the same as the one employed for cooling, typically helium, or a different one, less expensive than the cooling gas (e.g. nitrogen). The first case results in discharging a certain amount of cooling gas in the atmosphere; in the second case, the cooling gas flowing inside the cooling tube will be contaminated with the (different) buffer gas and should thus undergo to purification before being recycled. It is thus preferred to employ the same cooling gas (e.g. helium) for the chamber close to the cooling tube and a different gas (e.g. nitrogen) for the most external buffer chamber. In this manner, a minor amount of cooling gas (much expensive than nitrogen) is lost in the environment, while at the same the contamination of the cooling gas is substantially reduced. The applicant has observed that with this solution, for a flow rate of the buffer gases of about 1–2 l/min, an amount of about 10% of nitrogen (which makes purification necessary) is present in the helium cooling gas only after 3–5 days; the same amount is instead reached after less than 1–2 hours when a buffer unit with the only nitrogen as buffer gas is employed. When desired, also the buffer unit may be incorporated into a single-piece cooling unit, as previously discussed for incorporating two or more modules in the same single-piece cooling unit.

With the cooling device of the present invention, the total flow rate of the gas inside the cooling tube may be increased consistently with the length of the tube, without negatively affecting the properties of the fiber due to undesired vibrations inside the cooling tube. Furthermore, with the cooling apparatus and method of the present invention, the heat exchange between cooling gas and fiber is highly effective and substantially constant along the whole length of the cooling tube. Due to the high efficiency of the method and apparatus of the present invention, the cooling gas may be employed at an operating temperature substantially higher than the temperature used in the prior art methods. Accordingly, with temperatures of about 0° C. of the cooling gas, the cooling device and method of the invention allows to increase the drawing speed of the fiber above 20 m/s, in particular up to 23 m/s and more.

The above disclosed parameters of the cooling method according to the invention may be suitably varied depending on the specific drawing conditions, in order to optimize the cooling efficiency of the device. For instance, the applicant has observed that, by maintaining the same total flow rate, the longer the cooling tube the better is the cooling of the fiber. Thus, the length of the cooling device should be set as to be the longest possible, in accordance with the dimension of the whole drawing apparatus.

The following specific example will further illustrate the advantages of the invention.

EXAMPLE

The cooling device (reference is also made to the figures) has a length of 4.6 m and comprises 2 superposed cooling units, each unit consisting of two single-piece symmetric halves, both being comprised of:

four modules, each module having a length of 55 cm, for a length of each cooling tube of 2.20 m;

two couples of buffer units (length=2.5 cm for each unit) placed at the ends (top and bottom) of each cooling unit.

The cooling tube has a square section, the dimensions of the central part (404) being 16×16 mm and the outer dimensions (which substantially define the dimension of the inner chamber 401) being 40×40 mm. Each module has ten 1×50 mm rectangular slots (402), spaced each of 5 mm.

The modules are disposed so to allow the transversal flow of cooling gas into each module to be alternated between two adjacent modules, as shown in FIG. 6. Each module has an inlet and outlet (203) for the cooling gas positioned at about 10 cm from the bottom of each module.

Helium at a temperature of about 0° C. is used as cooling gas. Helium flow rate is about 300 l/min for each cooling unit (75 l/min for each module) corresponding to a unitary flow rate of about 136 l/min and a transversal speed of helium of about 0.85 m/s in the proximity of the fiber. A vacuum of about 0.9 bars is applied at the outlets of the cooling tubes by means of a membrane vacuum pump.

Drawing speed is set at about 20 m/s.

The top of the cooling device is placed at about 3.25 m from the bottom of the drawing furnace. Accordingly, the fiber enters into the cooling device at a temperature of about 1000° C.

The temperature of the fiber at the exit of the cooling device is about 30° C., while the temperature of the exhausted helium gas is about 60° C.

Once cooled, the fiber (which has a diameter of about 0.125 $\mu$m) enters into the coating die containing a liquid UV-curable acrylate-based composition, which is placed at about 20 cm from the bottom of the cooling device. The resin coating is then UV cross-linked and the coated fiber passes through a second coating die.

The above process has been repeated by varying the helium flow rates at different drawing speed, while using 1 or 2 of the above cooling unit. The temperature of the helium cooling gas was of 8° C.

The temperatures of the fiber at the output from the cooling device have been determined, and the results are shown in the following table 1.

TABLE 1

Temperature of the fiber at the output of the cooling device

| He flow rate for each unit | By using 1 cooling unit with drawing rate at | | | By using 2 cooling unit with drawing rate at | | |
|---|---|---|---|---|---|---|
| (l/min) | 15 m/s | 12 m/s | 10 m/s | 15 m/s | 12 m/s | 10 m/s |
| 150 | 277 | 196 | 137 | 66 | 32 | 18 |
| 180 | 235 | 158 | 105 | 45 | 22 | 13 |
| 210 | 199 | 127 | 80 | 36 | 16 | 10 |
| 240 | 171 | 104 | 63 | 25 | 13 | 9 |
| 270 | 146 | 85 | 62 | 19 | 11 | 9 |
| 300 | 125 | 70 | 39 | 16 | 10 | 9 |

These results show that by increasing the length of the cooling device, with the same helium flow rate at the same drawing speed, the efficiency of the heat exchange is improved. In particular, by using 2 cooling units (total length 4.6 m), each with a He flow rate of 150 l/min (i.e. a total flow rate of 300 l/min), the fiber is cooled down at a lower temperatures than by using a single unit (2.3 m) with the same total helium flow rate.

Similarly, the above process has been repeated, using a helium flow rate of 300 l/min for each cooling unit, for determining the influence of the variation of the helium temperature (from 20° C. to −20° C.) on the temperature of the fiber at exit of the cooling device (table 2) and on the temperature of the exhausted helium (table 3).

TABLE 2

Temperature of the fiber at the output of the cooling device (He flow rate = 300 l/min for each cooling unit)

| He inlet temperature | Temperature of the fiber (° C.) | | | | | |
|---|---|---|---|---|---|---|
| | By using 1 cooling unit with drawing rate at | | | By using 2 cooling units with drawing rate at | | |
| (° C.) | 15 m/s | 12 m/s | 10 m/s | 15 m/s | 12 m/s | 10 m/s |
| 20 | 137 | 82 | 52 | 28 | 22 | 21 |
| 8 | 125 | 70 | 39 | 16 | 10 | 9 |
| 0 | 118 | 62 | 31 | 7 | 2 | 0 |
| −20 | 98 | 41 | 9 | −14 | −19 | −20 |

TABLE 3

Temperature of the exhausted helium gas

| He inlet temperature | Temperature (° C.) | | | | | |
|---|---|---|---|---|---|---|
| | By using 1 module with drawing rate at | | | By using 2 modules with drawing rate at | | |
| (° C.) | 15 m/s | 12 m/s | 10 m/s | 15 m/s | 12 m/s | 10 m/s |
| 20 | 107 | 94 | 83 | 69 | 59 | 53 |
| 8 | 93 | 80 | 69 | 55 | 46 | 40 |
| 0 | 83 | 70 | 60 | 46 | 37 | 31 |
| −20 | 58 | 46 | 36 | 23 | 15 | 9 |

What is claimed is:

1. Method for cooling an optical fiber which comprises:
passing said fiber through a hollow elongated body and flowing a cooling fluid, which is substantially a gas, onto said fiber, the flow direction of the cooling fluid being substantially transverse with respect to the longitudinal axis of the fiber when in contact with said fiber;
flowing said cooling fluid into said hollow elongated body through a first longitudinal opening; and
removing said cooling fluid from said hollow elongated body through a second longitudinal opening.

2. Method according to claim 1 wherein said longitudinal openings are provided on at least half of the total length of said elongated body.

3. Method according to claim 1 wherein each of a length of said first longitudinal opening and a length of said second longitudinal opening correspond to at least 75% of a total length of said elongated hollow body.

4. Method according to claim 1 wherein each of a length of said first longitudinal opening and a length of said second longitudinal opening ranges from about 80% to about 95% of a total length of said elongated hollow body.

5. Method according to claim 1, wherein said second longitudinal opening is positioned substantially on the opposite side of said hollow elongated body with respect to said first longitudinal opening.

6. Method according to claim 1, wherein the cooling fluid is forcibly removed from said hollow elongated body through said second longitudinal opening.

7. Method according to claim 1,
wherein flowing the cooling fluid into said hollow elongated body through said first longitudinal opening further comprises:
introducing the cooling fluid into a first hollow space defined by an inner and an outer wall of a first double-walled half-tube;
flowing the cooling fluid from said first hollow space through said longitudinal opening, provided on the inner wall of said first double-walled half-tube, into a central chamber defined by the inner wall of said first double-walled half-tube and by the inner wall of a second double-walled half-tube, in order to cool an optical fiber being passed through said central chamber;
and wherein removing the cooling fluid from the hollow elongated body through said second longitudinal opening further comprises:
flowing the cooling fluid from said central chamber through said second longitudinal opening, provided on the inner wall of said second double-walled half-tube, into a second hollow space defined by the inner and the outer wall of said second double-walled half-tube; and
removing the cooling fluid from said second hollow space.

8. Method according to claim 1 wherein:
at least a first portion of the fiber is subjected to a substantially transversal flow of cooling fluid in a first direction; while
at least a second portion of said fiber is subjected to a second substantially transversal flow of cooling fluid in a second direction.

9. Method according to claim 8 wherein said second flow direction of the cooling fluid is substantially opposite with respect to the first one.

10. Method according to claim 1, wherein said hollow elongated body further comprises one or more additional first longitudinal openings, and one or more second longitudinal openings.

11. Method for producing an optical fiber which comprises the following steps of:
heating the bottom end of a glass preform at its softening temperature,
drawing an optical fiber from the softened bottom end of said preform,
cooling said optical fiber according to the cooling method of claim 1 or claim 7; and
coating the cooled fiber with a protective coating.

12. Method according to claim 11, wherein the temperature of the cooling fluid is from about −20° C. to about 20° C.

13. Method according to claim 12 wherein the temperature of the cooling fluid is from about 0° C. to about 10° C.

14. Method according to claim 11 wherein the flow rate of the cooling fluid is from about 20 l/min to about 200 l/min for each meter of length of the hollow elongated body.

15. Method according to claim 14, wherein the flow rate of the cooling fluid is from about 75 l/min to about 150 l/min for each meter of length of the hollow elongated body.

16. Method according to claim 11 wherein the cooling fluid is helium, nitrogen, carbon dioxide or mixtures thereof.

* * * * *